US006291785B1

(12) United States Patent
Koga et al.

(10) Patent No.: US 6,291,785 B1
(45) Date of Patent: Sep. 18, 2001

(54) ADDRESS READER, SORTING MACHINE SUCH AS A MAIL THING AND CHARACTER STRING RECOGNITION METHOD

(75) Inventors: Masashi Koga, Hachioji; Tatsuhiko Kagehiro; Yoh Ueda, both of Kokubunji; Shigeru Watanabe, Owariasahi; Hiromichi Fujisawa, Tokorozawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/245,745

(22) Filed: Feb. 8, 1999

(30) Foreign Application Priority Data

Feb. 10, 1998 (JP) .................................................. 10-028077

(51) Int. Cl.[7] .............................. B07C 5/00; G06K 9/00
(52) U.S. Cl. ......................... 209/584; 209/900; 382/179; 382/184; 382/187
(58) Field of Search .................................. 209/584, 900; 382/101, 177, 178, 179, 181, 184, 185, 186, 187

(56) References Cited

U.S. PATENT DOCUMENTS

| | | | | |
|---|---|---|---|---|
| 5,315,668 | * | 5/1994 | O'Hair | 382/159 |
| 5,321,768 | * | 6/1994 | Fenrich et al. | 382/178 |
| 5,697,504 | * | 12/1997 | Hiramatsu et al. | 209/584 X |
| 5,910,998 | * | 6/1999 | Yui | 209/900 X |

OTHER PUBLICATIONS

T. Akiyama et al, "A Document Image Segmentation Method Based on Projection Profiles and Stroke Densities", NTT Electrical Communications Laboratories, pp. 23–33.

N. Nakajima, et al, "Analysis of Address Layout on Japanese Handwritten Mail–A Hierarchical Process of Hypothesis Verification"–, Proceedings of ICPR '96, IEEE, 1996, pp. 726–731.

G. Kim, et al, "A Lexicon Driven Approach to Handwritten Word Recognition for Real–Time Applications", IEEE Transactions on Pattern Analysis and Machine Intelligence, vol. 19, No. 4, Apr. 1997, pp. 366–379.

H. Yashiro et al, "A New Method of Documents Structure Extraction using Generic Layout Knowledge", International Workshop on Industrial Applications of Machine Intelligence and Vision (MIV–89), IEEE, Tokyo, Apr. 10–12, 1989, pp. 282–287.

\* cited by examiner

*Primary Examiner*—Tuan N. Nguyen
(74) *Attorney, Agent, or Firm*—Antonelli, Terry, Stout & Kraus, LLP

(57) ABSTRACT

An address reader method and apparatus for recognizing a receiver address on a surface of mail. In the invention an image of the surface of the mail is input and segmented into at least one character string candidate. At least one address area candidate is extracted from the image based upon the segmented character string candidate. One of the address area candidates extracted from the image is selected as a receiver address of the mail by analyzing each of the address area candidates based on predetermined position information indicating a usual position of a receiver address area, character direction information indicating a character direction of a character string appropriate for the predetermined position information, and key character string information indicating a character string most likely to exist in a receiver address. Characters in character strings of the selected address area candidate are recognized as a receiver address which is used to sort the mail.

3 Claims, 11 Drawing Sheets

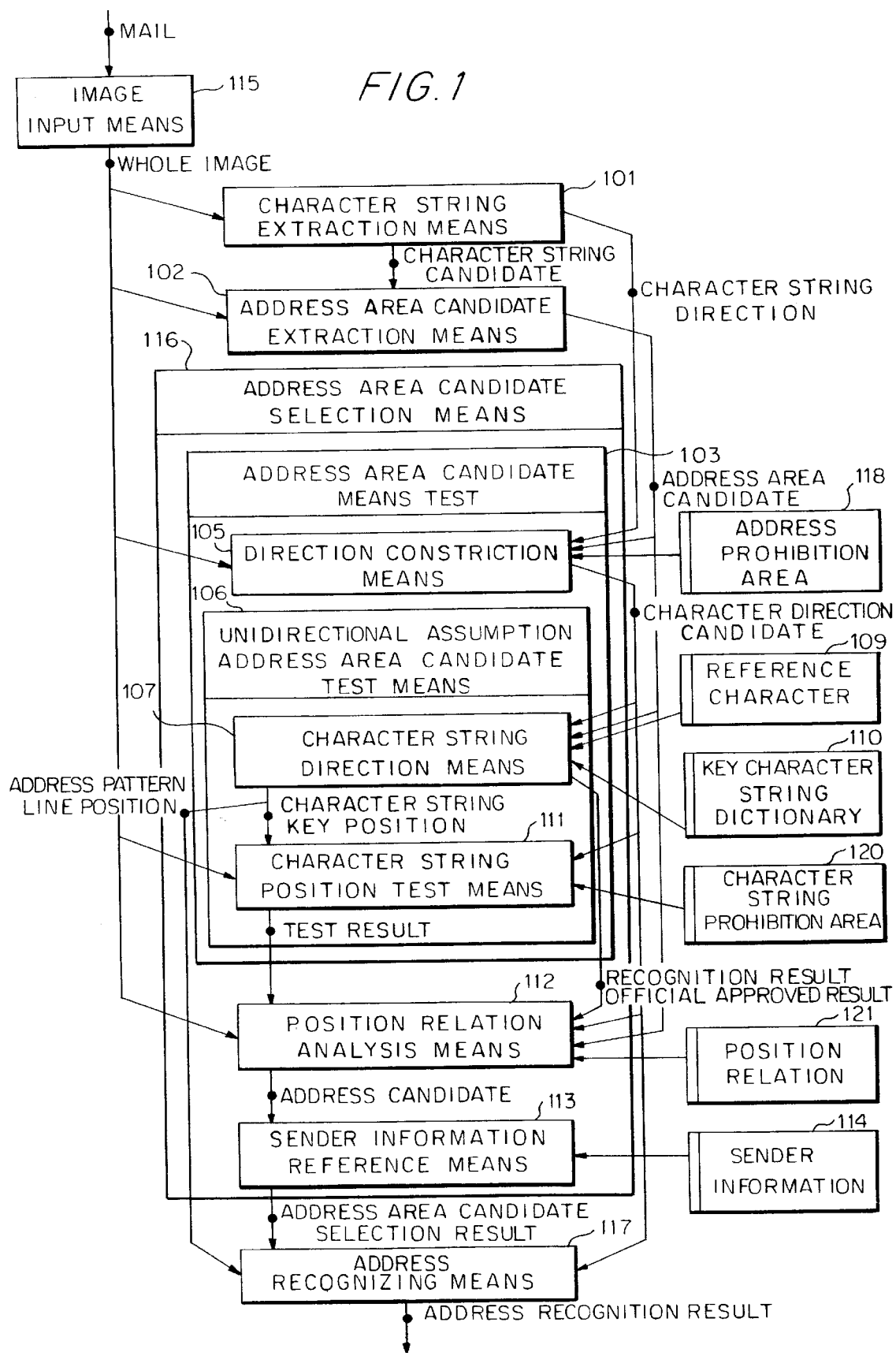

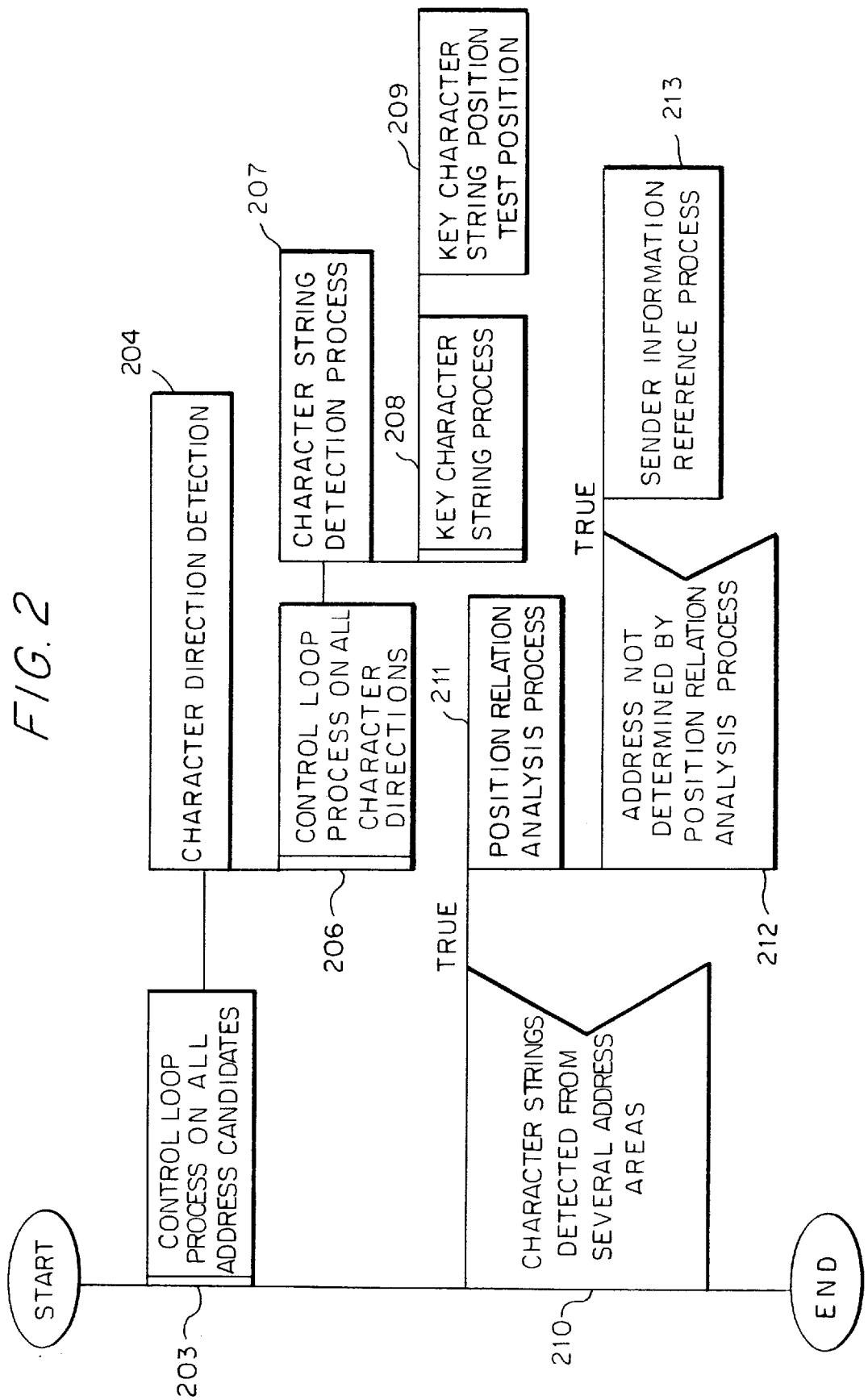

FIG. 8

CLASSIFICATION RESULT TABLE

| STARTING POINT NODE (pnd) | ENDPOINT NODE (nnd) | CLASSIFICATION RESULT CHARACTER CODE (cd) | CERTAINTY FACTOR (crd) | POINTER (ptn) |
|---|---|---|---|---|
|  |  |  |  |  |
| 31 | 32 | 6 | 0.6 | ● → 6 |
| 32 | 33 | p | 0.7 | ● → p |
| 33 | 34 | o | 0.9 | ● → o |
| 33 | 34 | O | 0.9 | ● |
| 33 | 35 | w | 0.8 | ● → oo |
|  |  |  |  |  | though additional
ADDRESS READER, SORTING MACHINE SUCH AS A MAIL THING AND CHARACTER STRING RECOGNITION METHOD

CROSS REFERENCED TO RELATED APPLICATION

The present application is related to application Ser. No. 08/763,515, filed Nov. 11, 1996, by T. Kagehiro et al entitled "METHOD OF READING CHARACTERS AND METHOD OF READING POSTAL ADDRESSES".

FIELD OF THE INVENTION

The present invention relates to an address reader method and apparatus for recognizing addresses or names on the surfaces of mail (letters, packages, postcards, periodicals, etc.). More particularly, the present invention relates to an address reader method and apparatus for recognizing addresses and names on the surfaces of mail by determining whether an address area is most likely to be an address area that contains an address or name that corresponds to particular address or names such as a receiver of the mail.

BACKGROUND OF THE INVENTION

In a conventional method of recognizing an address from the surface of mail, the following steps are performed:

(1) Images of the mail are photoelectric transformed and input as a digital image to the address recognizer, (2) Address area candidates are extracted from the digital image of the mail, wherein each address area candidate includes a plurality of character line and address line candidates, and (3) The characters included in the address area candidates are read and interpreted as a character string.

A technique for accomplishing step (2) as described above is disclosed in "A NEW METHOD OF DOCUMENT STRUCTURE EXTRACTION USING GENERIC LAYOUT KNOWLEDGE" by H. Yashiro, et al, Proc. of International Workshop on Industrial Applications of Machine Intelligence and Vision (MIV-89), IEEE, Apr. 10, 1989. This reference illustrates that if the image area includes a character line, then an area including the image area is extracted as an address area candidate.

Another technique for accomplishing step (2) is disclosed in "DOCUMENT IMAGE SEGMENTATION METHOD BASED ON PROJECTION PROFILES AND STATE DENSITIES", by T. Akiyama, et al. This reference describes that first, an area in which an address may be described is extracted and second, a character line in the area is extracted. When extracting the address area candidates several address areas are picked up.

Yet another technique is described in "ANALYSIS OF ADDRESS LAYOUT ON JAPANESE HANDWRITTEN MAIL" by N. Nakajima Proc. Of Icpr '96, IEEE, 1996. This reference describes a method of using layout information such as the arrangement of an address area candidate in the image, a shape of an address area candidate, an arrangement of a character line in the address area candidate and a shape of the image of the mail.

Generally, even if an address area is selected on the basis of layout information, the selected result depends on a character direction, and a processing result. It is difficult to correctly distinguish a character direction using only layout information. For example, in address area 300 illustrated in FIG. 3A. a character line "Flower, AZ 11111" is shown as part of an address.

In some situations, based on the position or a shape of the character line in the address area 300, the relationship between shape of the mail and a character line direction in the address area cannot be determined. A character line direction is a direction in which successive characters of a line of characters are disposed. Usually a character is written on the right side of a preceding character in a line of characters. In the case of FIG. 3A, the character line direction is from left to right.

Conventional equipment for address recognition from a rectangular shaped mail item cannot determine the correct character line direction in the following situations:

(1) When the shape of the mail is oblong, a character line direction in the address area candidate is lateral, writing from the left to the right. The upper direction of FIG. 3A is the upper portion of a character.

(2) When the shape of the mail is oblong, a character line direction in the address area candidate is lateral, writing with an opposite direction from the top and bottom of a character. The character line is lateral writing from the right to the left.

(3) When the direction of a character line and the direction of a character are rightward. In FIG. 3A, the character line is vertical, writing from the left to the right.

(4) When the shape of the mail is oblong, in the above case (3), the direction of a character line and a direction under the character conforms in the rightward direction. The character line is vertical, writing from the right to the left.

Therefore, according to the above a correct address area cannot be chosen from several address area candidates by using information of a layout since layout information does not address these situations.

Japanese patent Laid-open print No. 8-224550 discloses an apparatus which performs processing of addresses by obtaining address area information. In this reference, the first step analyzes arrangement of a character line candidate in a address area extracted as a candidate, and the second step selects the head line of the address area candidate. The third step recognizes a pattern in the head line and recognizes whether the recognized pattern is a valid address. The fourth and final step selects the address area including the address head line as a correct address area if it was determined to be valid.

When applying the above described conventional technique to equipment for address recognition such as a mail sorting machine, there is the following problems. At the time of address reading of mail, time is needed to perform a receiver's address character recognition exactly in the address area candidates by extracting a particular area. Thus, a mail sorting machine that handles a large quantity of mail cannot use the above described conventional technique when the machine needs the speed and accuracy since it would be very time consuming. Moreover, noise such as an illustration or mark, that is ambiguous relative to a character in the neighborhood of an address described in mail, and a character that is ambiguous relative to a zip code and addresses such as an advertisement can cause problems. Further, it is difficult to determine a character direction in an address area candidate based on information about a layout since the direction of the characters come from the characters themselves and information of a character string containing the character.

SUMMARY OF THE INVENTION

The present invention provides an address reader method and apparatus for selecting a particular address area as most likely being an address area containing, for example, a receiver address from several address area candidates obtained from the surface of mail and recognizing character strings contained in the selected address area. Mail includes letters, postcards, packages, periodicals, etc. An address could, for example, include an addressee and a destination address. The addressee could, for example, be the same of a person, corporation, division, department, etc. The destination address could, for example, include a suite, apartment, or floor number, etc., city, state and zip code, country.

The present invention provides an address reader method and apparatus for recognizing characters contained in a particular address area selected from a plurality of address area candidates as an address area most likely to contain a receiver address. The present invention accomplishes the above by inputting an image of a surface of the mail and segmenting the image into at least one character string candidate. Thereafter, at least one address area candidate is extracted based on the character string candidate and one of the at least one address area candidate is selected as a receiver address area of the mail. The selection is performed by analyzing each of the at least one address area candidate based on predetermined positional information, information of a character direction appropriate for the predetermined positional information, and key character string information. The receiver address contained in the selected address area candidate is then recognized by analyzing character strings included therein.

The address reader method and apparatus of the present invention can, for example, form part of a mail sorting machine which includes a scanner and a sorter. The scanner scans the surface of the mail and inputs an image of the surface to the address reader method and apparatus of the present invention. The sorter receives the recognized receiver address output by the address reader method and apparatus of the present invention and sorts the mail based on the recognized receiver address.

The selection of an address area candidate as most likely containing, for example, a receiver address is performed by comparing character strings in the address area candidate to key character strings. The key character string are strings of characters that would mostly exist in an address area candidate for the address area candidate to be considered, for example, a part of a receiver address. If the key character string exists in the character strings of the address area candidate and the key character string is in the appropriate position and character direction as per the positional information and character direction, then the address area candidate is selected as an address area candidate most likely containing a receiver address.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which:

FIG. 1 illustrates the flow of data of an embodiment of the present invention;

FIG. 2 illustrates the processing flow of an embodiment of the present invention;

FIG. 8 illustrates a classification result table formed based on the classification result network;

DETAILED DESCRIPTION OF THE INVENTION

The data flow diagrams used to describe the present invention conforms to the disclosure of such data flow diagrams in "Software Structuralization Technique", by J. Martin, Modern Science Company.

The present invention provides an address reader method and apparatus that detects address area candidates on the surface of mail and determines which one of the address area candidates is most likely a valid receiver address. In FIG. 1 a data flow diagram is provided for graphically illustrating the flow of data when the processings of the present invention are performed.

Figure 12:
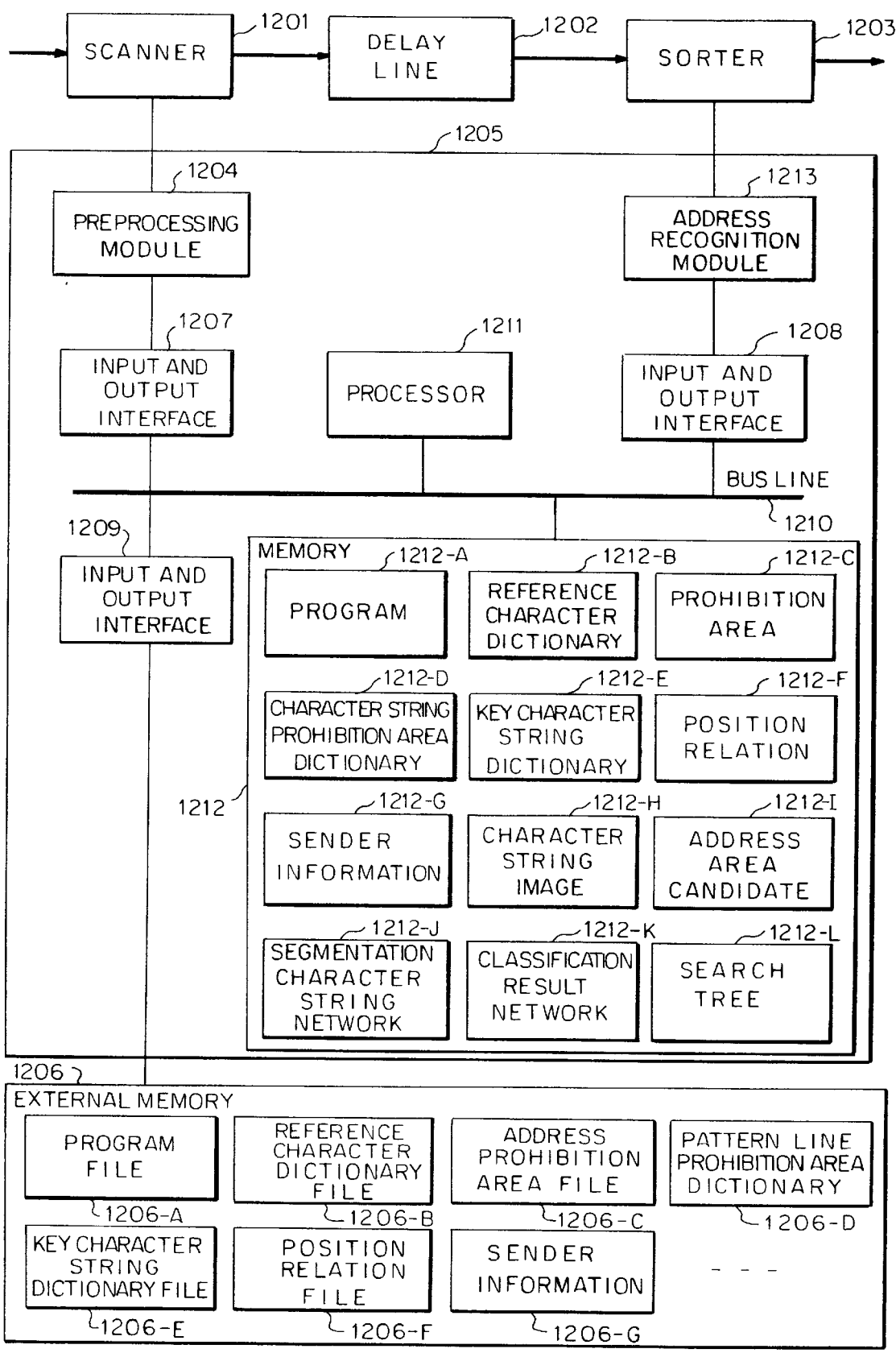
FIG. 12 illustrates an embodiment of the apparatus of the present invention.

An example of the apparatus of a mail sorting machine which includes the features of the present invention is illustrated in FIG. 12. The mail sorting machine of the present invention illustrated in FIG. 12 includes an address reader 1205 which is connected to an external memory 1206, scanner 1201 and sorter 1203. The scanner 1201 is connected to the sorter 1203 via a delay line 1202 and apparatus such as, for example, conveyor belts.

The address reader 1205 executes a processing on an image of the surface of mail obtained by the scanner 1201 by using information stored in memory address areas of memory 1212 or file stored in the external memory 1206 according to the processings illustrated in FIG. 1. Further, details of the mail sorting machine of the present invention illustrated in FIG. 12 will be described below. The following is a description of the processings executed by the present invention using the data flow diagram in FIG. 1.

According to FIG. 1, the address reader, for example, includes image input means 115, character string extraction means 101, address area candidate extraction means 102, Address area candidate selection means 116 and address recognizing means 117. The image input means 115 corresponds to the scanner 1201 of FIG. 12. The image input means 115 inputs a digital image of the surface of the mail by use of, for example, a photoelectric device. The character string extraction means 101 segments the image into character string candidates.

The address area candidate extraction means 102 extracts address area candidates each including at least one character string candidate. Typically at least one address area candidate is extracted based on each character string candidates. An address area candidate selection means 116 selects a candidate address area, from the extracted address area candidates, most likely to be a receiver address. When only one address area candidate has been extracted, the address area candidate selection means 116 confirms that the one address area candidate contains a receiver address. The address recognizing means 117 recognizes an address contained in the selected address area candidate and outputs an address recognition result. The address recognition result is used by the sorter 1203 to sort the mail.

The above described processings performed by the mail sorting machine of the present invention as illustrated by the data flow diagram of FIG. 1, can be accomplished by a computer program (software) executable by the mail sorting machine illustrated in FIG. 12. Each of the elements of the data flow diagram could, for example, correspond to one or more instructions of the computer program. The computer program could, for example, be stored in memory 1212 or the external memory 1206 of the mail sorting machine illustrated in FIG. 12. The computer program could, for example, be provided for installation in the mail sorting machine of the present invention by a storage medium on which the computer program is stored. The storage medium could, for example, be a floppy disk, CD ROM, etc. The computer program could also be provided to the mail sorting machine by a network for installation in the mail sorting machine.

The entire image of the surface of the mail and an address area candidate is input into address area candidate selection means 116. The address area candidate selection means 116 refers to address prohibition area information 118, reference character information 109, key character string dictionary 110, character string prohibition area information 120, position information 121, and sender information 114 during processing. Based on the above described information a address area candidate that most likely contains a receiver address is selected from the entire image of the surface of the mail.

The reference character information 109 is provided by a table which stores information of a standard feature quantity vector of a character pattern. The reference character information 109 is referred to at the time of character classification processing by the address area candidate selection means 116.

The key character string dictionary 110 stores character strings that most likely would be included in a receiver address in order for the address area candidate to be considered an address area containing a valid receiver address. That is, key character string dictionary 110 stores KEY CHARACTER STRINGS. A key character string can, for example, include a part of a receiver address such as an addressee name (recipient), a destination address name, etc. Inclusion of one of these key character strings in an address area candidate indicates that the address area candidate is most (highly) likely an address area containing a proper receiver address. The key character string could, for example, include particular words that are required to be included as part of a receiver address for the address to valid. For example, in case of an address in Japan, The Republic of Korea and China, such a word could, for example, be a prefecture, city, town or village name. In the case of an address in the United States, such a word could, for example, be a street, district, or state name.

The address prohibition area information 118 stores information of an area on the surface of the mail on which the placement of an address area is prohibited. Information is also stored of an area that prohibits the placement of a character string that corresponds to a key character string as the character string prohibition area information 120. The character string prohibition area information 120 provides such information for every direction the character string can be placed on the surface of the mail.

The appropriate positional relationship between address area candidate used to select an address area candidate containing a key character string is provided as position relation information 121. The position relation information 121 could, for example, provide information indicating the positional relationship between a sender address area and a receiver address area. Sender information such as, for example, information of a neighborhood or region where the sender of the mail is located is provided as sender information 114.

The address area candidate selection means 116 includes an address area candidate test means 103, position relation analysis means 112 and sender information reference means 113. The output of the address area candidate extraction means 102 is input to the address area candidate test means 103. An indication of whether the input address area candidate, upon which a search is performed, is an address area candidate containing a character string that corresponds to a key character string, is output by the address area candidate test means 103.

If a key character string is not detected as being contained in the address area candidate, then the address area candidate test means 103 rejects the address area candidate and excludes it as an address area containing a receiver address. If the address area candidate test means 103 receives several address area candidates, then an indication is provided for each address area candidate whether it contains a receiver address.

By use of the position relation analysis means 112, positional relationship between address area candidates containing key character strings are analyzed, and an address area candidate in the proper position relative to the other address area candidates is selected as an address area most likely to contain a receiver address.

The sender information 114 is used by the sender information reference means 113, to determine which address area candidate from the several address area candidates is most likely an address area containing a receiver address rather that a sender address. It is assumed that the sender sent the mail from some region or neighborhood containing or close to the address of the sender. Accordingly, the sender information includes, for example information of the region or neighborhood containing or near the address of a sender. Usually the sender information takes on information of the neighborhood or region where the mail sorting machine is located. It is assumed that the sender is located in the vicinity of the location of the mail sorting machine. By use of the sender information an address area candidate having an address in the neighborhood or region containing or near the sender address is excluded as not likely being an address area candidate containing a receiver address.

The address area candidate test means 103 includes direction constriction means 104 and unidirectional assumption address area candidate test means 106. The output of an address area candidate from the address area candidate extraction means 102 is input into the direction constriction means 104. The input address area candidate is processed by the direction constriction means 104 to determine whether an arrangement of characters in the address area candidate has a character string in one of a plurality of directions appropriate for the permitted address styles illustrated, for example, as shapes of address areas in FIGS. 4A–E. The directions of a character string can, for example, be one of a horizontal (x) direction or a vertical (y) direction as shown in FIGS. 4A–E. The horizontal and vertical directions are detected based on information provided by the character string detection means 101. The direction constriction means 104 outputs a character direction candidate as a result of the processing.

The unidirectional assumption address area candidate test means 106 makes an assumption that the character string extends in a single candidate character direction based on the candidate character direction determined by the character direction constriction means 104. Based on the assumed candidate character direction, character strings in the address area candidate are searched to determine whether a key character string exists in the address area candidate.

The unidirectional assumption address area candidate test means 106 is started so as to process the character string in the address area candidate in all candidate character directions in an orderly manner. The number of candidate character directions is different according to the way in which an address is written in each country.

In the United States, the character direction of an address on the surface of mail, such as an envelope, could, for example, be horizontal and located at the top or bottom of the surface of the mail. In Japan, China and the Republic of Korea, the character direction of an address on the surface of mail, such as an envelope, could, for example, be horizontal or vertical and located at the top, bottom, right, or left of the surface of the mail.

The processing in the unidirectional assumption address area candidate test means 106 aids in indicating whether an address area candidate is most likely an address area containing a receiver address based on whether a key character string exists in the assumed character direction. The unidirectional assumption address area candidate test means 106 includes character string detection means 107 and character string position test means 111.

The character string detection means 107 segments at least a part of a character from a character string in the address area candidate. The degree of similarity of the at least part of the character and a reference character 109 is checked. If the similarity is high then the at least part of a character is determined to be the reference character. Once the characters of the character string have been determined, then a search is performed to determine whether a key character string exists in the character string. If a key character string is found, then the character string position test means 111 refers to the character string prohibition area information 120, and examines whether the position and the character direction of the key character string are proper. The character string prohibition area information 120 indicates an area on the surface of the mail in which a key character string should not exist. If the key character string exists in the area indicated by the character string prohibition area information 120, then the key character string is excluded as a candidate address area containing a receiver address. If not, the address area candidate is output by the character string position test means as an approved address area candidate (test result).

When an address area candidate has been selected, address recognition means 117 is started. The processing executed by the character string detection means 107 with respect to all character strings is performed by referring to information stored in a key character string dictionary 110. The selected address area candidate output by the address area candidate selection means 116 is analyzed by the address recognition means 117 so as to recognize the characters in the address.

The address recognition means 117 executes processing on the selected address area candidate based on information of the address character string position output by the character string detection means 107, and the candidate character direction output by the direction constriction means 104. Part of the processing to generate the selected address area candidate can be omitted, thereby shortening the processing time. Particularly, for example, the processing performed by the sender information reference means 113 can be omitted by using particular words wherein 1 or 2 characters are deleted as a key character string.

An example of the processing performed by the address area candidate selection means 116 of the present invention is illustrated by the flowchart illustrated in FIG. 2. It should be noted that each of the steps of the flowchart could, for example, correspond to one or more instructions of a computer program executable by the address reader 1205 so as to implement the address area candidate selection means 116. The computer program could, for example, be stored in the memory 1212 or the external memory 1206 of the mail sorting machine illustrated in FIG. 12. The computer program could also be provided for installation in the mail sorting machine by a storage medium or by a network connected to the mail sorting machine. The storage medium could, for example, be a floppy disk, CD ROM, etc.

In the flowchart, a first control loop process 203 is provided to cause the processings of the address area candidate selection means 116 to be performed on each address area candidate detected by the address area candidate extraction means 102. Included in the first control loop process 203 is a candidate character direction detection process 204 which detects the character direction of character strings included in an address area candidate and a second control loop process 206 for processing each of the candidate character directions detected by the character direction detection process 204. The second control loop process 206 includes a character string detection process 207 which detects whether a character string exists in the character string direction and whether the character string is a key character string, and a third control loop process 208 which is performed with respect to all key character strings detected by the character string detection process 207.

The third control loop process 208 includes a key character string position test process 209 which tests whether each key character string is in fact a key character string since such key character strings are required to be placed at a certain position on the surface of the mail. If the key character string is placed on the surface of the mail at the appropriate position, then the address area candidate including the key character string is indicated as being an address area most likely having an appropriate receiver address.

Subsequent to performing the first control loop process 203 with respect to each of the address area candidates, a process 210 is performed to determine whether several address area candidates have been indicated as containing a key character string. If such is true then a position relation anaylsis process 211 is performed so as to determine the positional relationships between each of the address area candidates which have been indicated as containing key character strings. The position relation analysis process 211 attempts to determine with respect to each address area candidate whether the address area candidate is most likely an address area which contains a receiver address based on the position of the address area candidate to the other address area candidates. For example, as described above in the United States, typically the sender address is positioned above the receiver address on an envelope. Thus, if it can be determined that one of the address area candidates is below the other address area candidates then it is highly likely that the address area candidate that is below the other address area candidates contains a receiver address.

If the position relation analysis process 211 is unable to determine the address area containing a receiver address based on the positional relationship between each of the address area candidates as per process 212, then a sender information reference process 213 is performed. The sender information reference process 213 compares the key character string of each address area candidate to sender information, for example, a region or neighborhood in which the mail was sent. It is more unlikely then not that the receiver address would be in the same region or neighborhood as the sender address. Thus, the address area candidate containing a key string which is not in the same region as the sender information would be indicated as highly likely of containing a receiver address.

FIGS. 3A–C and FIGS. 11A–E illustrate address area candidates upon which processings of the character row extraction means 101 and the address area candidate extraction means 102 are performed.

Figure 3A:
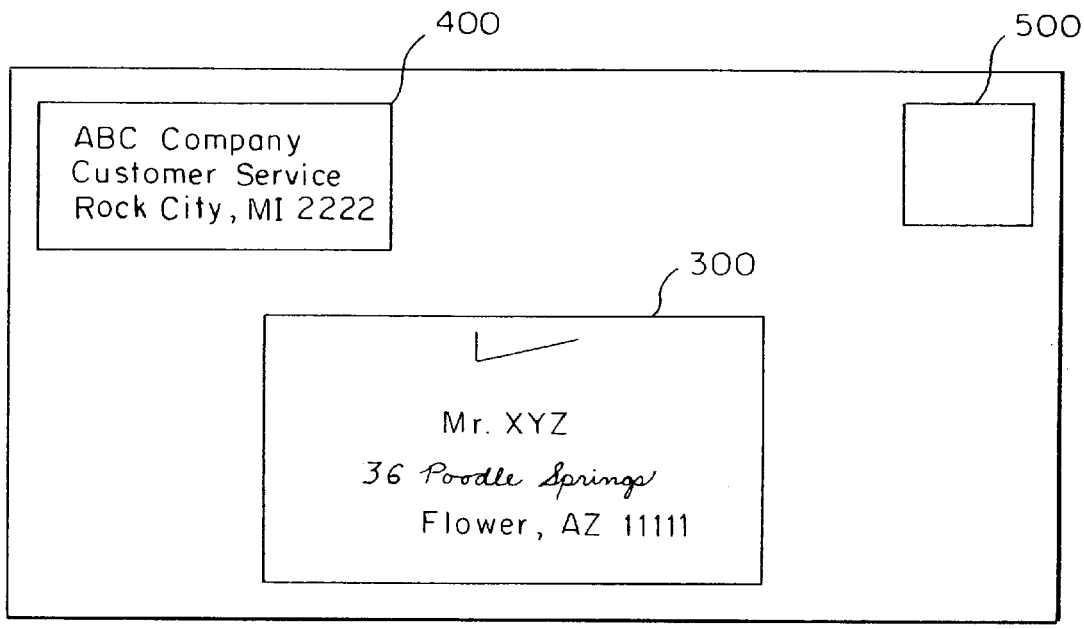
FIGS. 3A–C illustrate examples of address area candidates.

FIG. 3A is an example of the entire image of mail such as, for example, the surface of an envelope or a post card. As illustrated in FIG. 3A, the envelope includes a receiver address area 300, a sender address area 400 and a stamp area 500. The receiver address area 300 includes the name of the addressee "Mr. XYZ" and the destination address "36 Poodle Spring Street, Flower AZ 11111". The receiver address area 300 also includes an extrainous mark or shadow illustrated in the figure as a check mark. The sender address area 400 includes the name of the addressee "ABC Company, Customer Service" and the destination address "Rock City, Mich. 22222". The stamp area 500 includes a stamp and the associated information on the stamp.

Figure 3B:
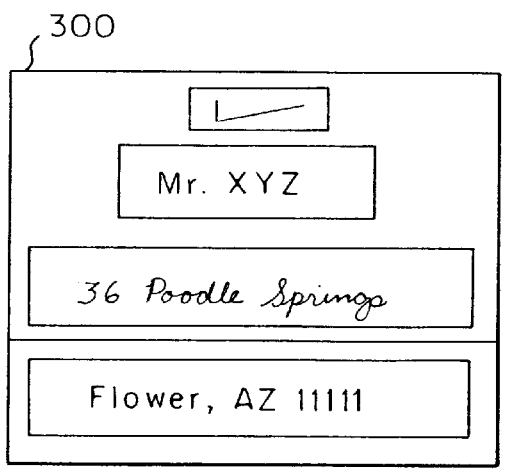
Figure 3C:
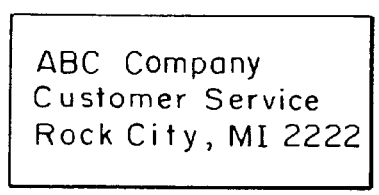

Conventional apparatuses have difficulty in detecting appropriate character strings when, for example, the address area includes an extrainous mark such as that illustrated in the receiver address area 300. Thus, conventional apparatus would detect the character strings in the receiver address 300 such as that illustrated in FIG. 3B. As can be seen in FIG. 3B, the extrainous mark is detected as a character string by the conventional apparatus. Conventional apparatuses also have difficulty in detecting the character strings when the size of the characters are rather small. Thus, for example, all of the character strings are indicated as a single character string by conventional apparatuses such as that illustrated in FIG. 3C.

The present invention overcomes the above by providing, for example, the direction contriction 104 which determines one or more candidate character directions according to the detected direction of a character string within an address area candidate. The direction constriction means 104 determines such candidate character directions based on the address prohibition area information 118 as illustrated, for example, in FIGS. 4A–H. Although, the examples illustrated in FIGS. 4A–H relate to the addressing rules of Japanese mail, it would be clear to one of ordinary skill in the art that other addressing rules such as that in the United States can be embodied in the address prohibition area information 118.

As illustrated in FIGS. 4A–H, areas on the surfaces of the mail at which it is inappropriate to place an address are illustrated by the shaded areas. Thus, for example, in FIG. 4A, the bottom portion of the surface of mail should not have an address placed thereon.

Figure 4A:
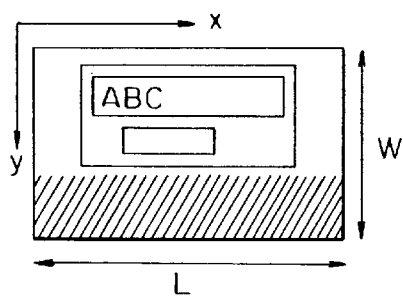
FIGS. 4A–H illustrate examples of character string directions to be recognized using predetermined information.
Figure 4B:
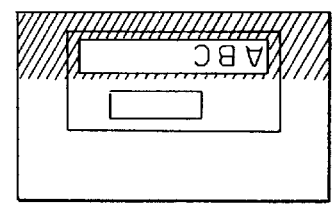

To further explain, as illustrated in FIGS. 4A–H the mail has a long side which corresponds to the X direction and a short side which correspond to the Y direction. FIG. 4A illustrates an addressing style where the address prohibition area is in the lower part of the surface of the mail when the mail is input to be scanned by the scanner 1201 in a forward direction. FIG. 4B illustrates an addressing style where the address prohibition area is the upper part of the surface of the mail with the area where an address may exist being open if the mail is input to the scanner in the backward direction.

Figure 4C:
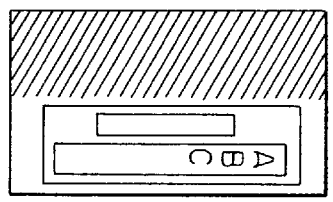

FIGS. 4C and D illustrate other addressing styles where the characters of the address are written one on top of the other in a vertical direction rather than in a horizontal direction. Thus, in FIGS. 4C and D the address prohibition area would be at the top portion of the mail if the mail is input in the forward direction and the bottom portion of the mail, with the exclusion of the character string areas, if the mail is input in the backwards direction.

Figure 4D:
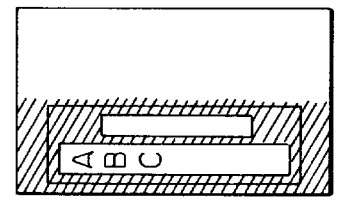
Figure 4E:
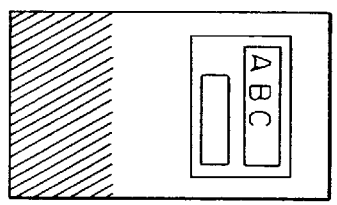

FIGS. 4E and F illustrate yet other addressing styles where the address is placed so as to be parallel to the Y axis which is the short side of the mail. Thus, in FIGS. 4E and F the address prohibition area would be at the left side of the mail when input in the forward direction and at the right side of the mail, excluding the character string areas when input in the backward direction.

Figure 4F:
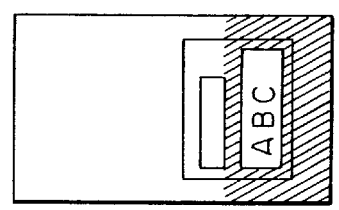
Figure 4G:
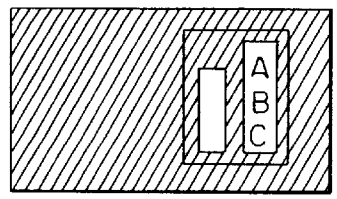

FIGS. 4G and H illustrate still yet other addressing styles wherein the characters of the character strings are placed one on top of the other in a vertical direction so as to be parallel to the Y axis, the short side of the mail. Thus, in FIGS. 4G and H the address prohibition area would be all of the surface of the mail excluding the character string areas.

The address prohibition area information 118 can be calculated according to the following equations with respect to each of the addressing styles illustrated in FIGS. 4A–H. An address prohibition area (range of X or Y) is determined as follows:

In FIG. 4A when a character row direction is parallel to the X axis, and Y=0 is the upper side of the mail, the address prohibition area is determined as follows:

$$Y > W \times 2/3$$

(W is the width of the Y axis direction of the image of mail)

In FIG. 4B when a character row direction is parallel to the X axis, and Y=0 is the upper side of the mail, the address prohibition area is determined as follows:

$$Y < W/3$$

In FIG. 4D when a character row direction is parallel to the X axis, and X=0 is the upper side of mail, the address prohibition area is determined as follows:

$$Y > W/2$$

In FIG. 4C when a character row direction is parallel to the X axis, and X=0 is the under side of mail, the address prohibition area is determined as follows:

$$Y < W/2$$

In FIG. 4E when a character row direction is parallel to the Y axis, and X=0 is the upper side of mail, the address prohibition area is determined as follows:

$X<W/2$

In FIG. 4E when a character row direction is parallel to the Y axis, and X=0 is the upper side of mail, the address prohibition area is determined as follows:

$X>L\times 2/3$

In FIG. 4G when a character row direction is parallel to the Y axis, and a character direction is vertical in the downward direction, all areas on the mail is an address prohibition area.

Figure 4H:
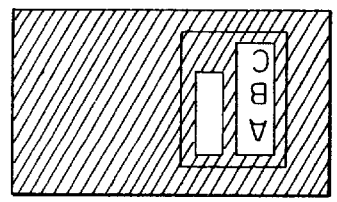

In FIG. 4H when a character row direction is parallel to the Y axis, and a character direction is vertical in the upward direction, all areas on the mail is an address prohibition area.

The processings performed by the address area candidate extraction means 102 is explained as follows. The address area candidate extraction means 102 receives character string candidates from the character string extraction means 101 and an image of the entire surface of the mail from the image input means 115. More particularly, the entire image of the surface of the mail input into the address area candidate extraction means 102 corresponds, for example, to any one of the images illustrated in FIGS. 4A–H. Based on one of the images of the surface of the mail illustrated in FIGS. 4A–H an address area candidate is output.

Figure 5:
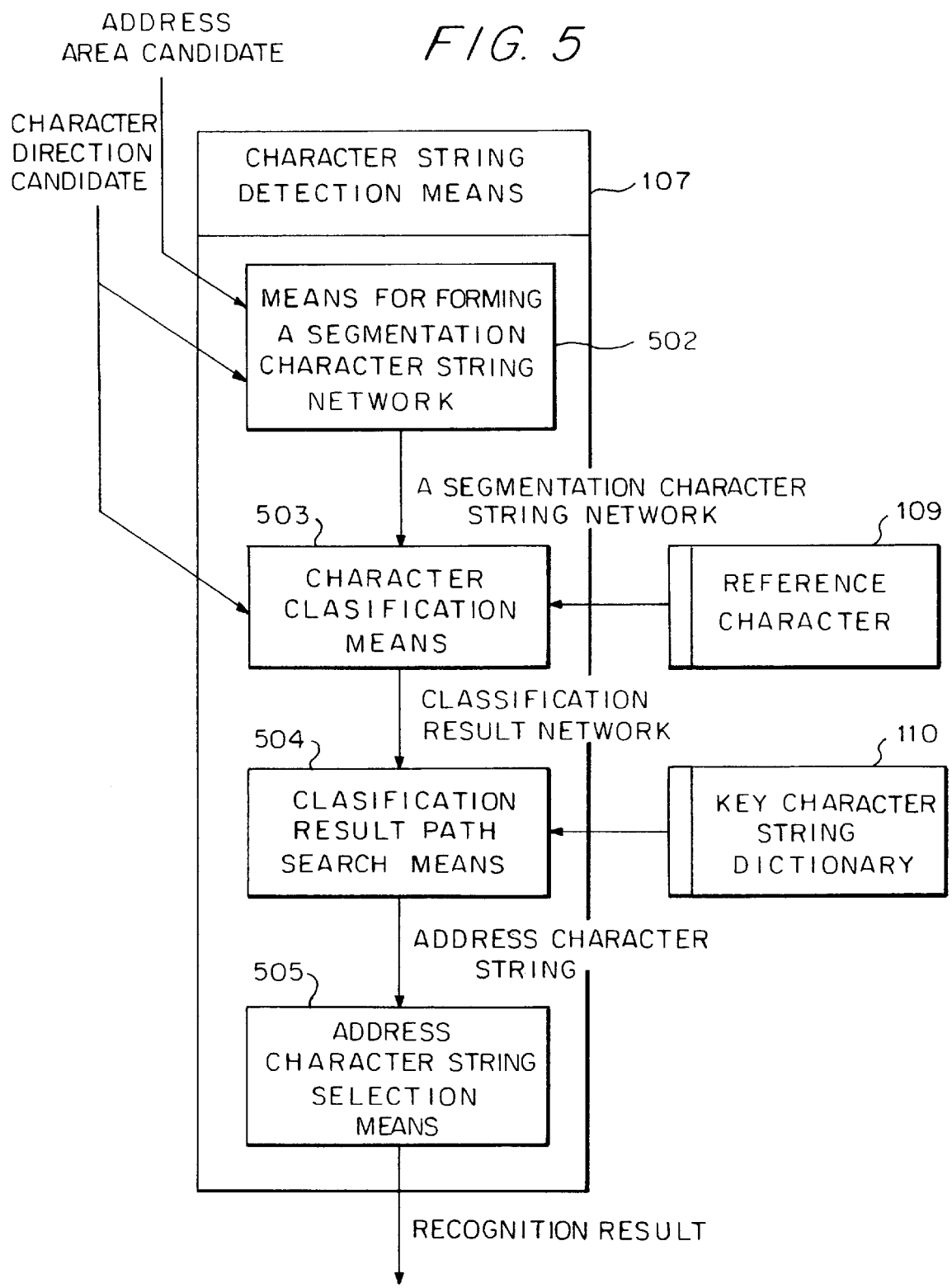
FIG. 5 illustrates the flow of data of character string search processing used in the present invention.
Figure 10:
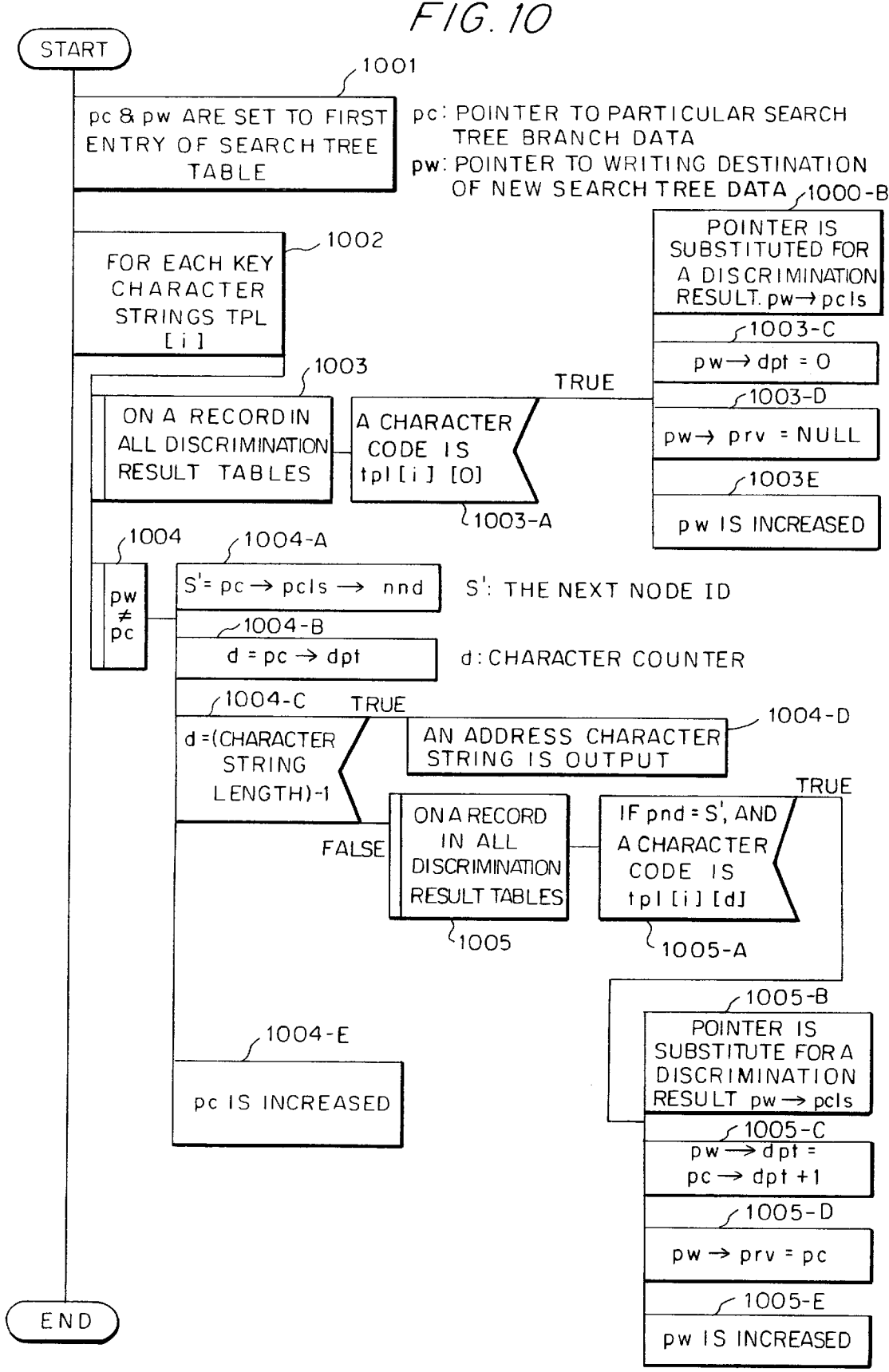
FIG. 10 illustrates the processing flow of character string search processing.

The processings performed by the character string detection means 107 are explained based on FIGS. 5 and 10. FIG. 5 illustrates a data flow diagram and FIG. 10 illustrates a flowchart of the processings performed by the character string detection means 107. Each of the elements of each of the data flow diagram and the flowchart, for example, may correspond to one or more instructions of a computer program executable by the address reader 1205. The computer program can, for example, be stored in the memory 1212 or the external memory 1206 of the mail sorting machine illustrated in FIG. 12. The computer program also could be provided for installation in the mail sorting machine by a storage medium or a network. The storage medium could, for example, be a floppy disk, CD ROM, etc.

The data flow diagram of the character string detection means 107 as illustrated in FIG. 5 includes means for forming a segmentation character string network 502, a character classification means 503, a classification result path search means 504 and an address character string selection means 505. The means for forming a segmentation character string network 505 forms a segmentation character string network as illustrated in FIG. 6 when, for example, operating on the receiver address area 300 illustrated in FIG. 3A as an address area candidate.

The processings performed by the character string detection means 107 according to data flow diagram illustrated in FIG. 5 are as follows. The means for forming a segmentation character string network 502 receives information of the candidate character direction from the direction constriction means 104 and information of the address area candidate from the address area candidate extraction means 102. As a result of processings performed on the candidate character direction and the address area candidate, the means for forming a segmentation character string network 502 outputs a segmentation character string network such as that illustrated in FIG. 6.

Figure 6:
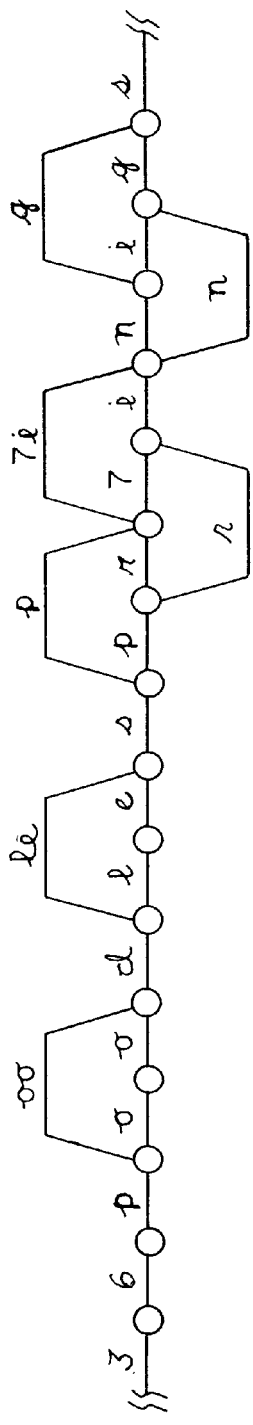
FIG. 6 illustrates an example of a segmentation character string network.

The segmentation character string network illustrated in FIG. 6 is developed by the means for forming a segmentation character string network 502 by cutting minimal portions of a character string from an actual character string such as that illustrated in FIG. 3A. The means for forming a segmentation character string network also proposes where necessary candidate characters for the portions of the character string. Thus, for example, as illustrated in FIG. 6, when reading the address of the addressee from the receiver address area 300 illustrated in FIG. 3A, the means for forming a segmentation character string network recognizes and separates the character portions "3", "6" "P", but proposes two candidate character portions "O" and "O" and "OO" for the characters "O" and "O". Such processing continues with respect to each portion of the character string until the end of the of the character string has been reached. The means for forming a segmentation character string network 502 then outputs the segmentation character string network.

The segmentation character string network along with the candidate character direction, and the reference character information 109 are input to the character classification means 503. The character classification means 503 based on such information performs a processing and outputs a classification result network such as that illustrated in FIG. 7. The classification result network illustrates characters which have been identified by the character classification means 503 in correspondence to the portions of the character string arranged in the segmentation character string network as illustrated in FIG. 6.

Figure 7:
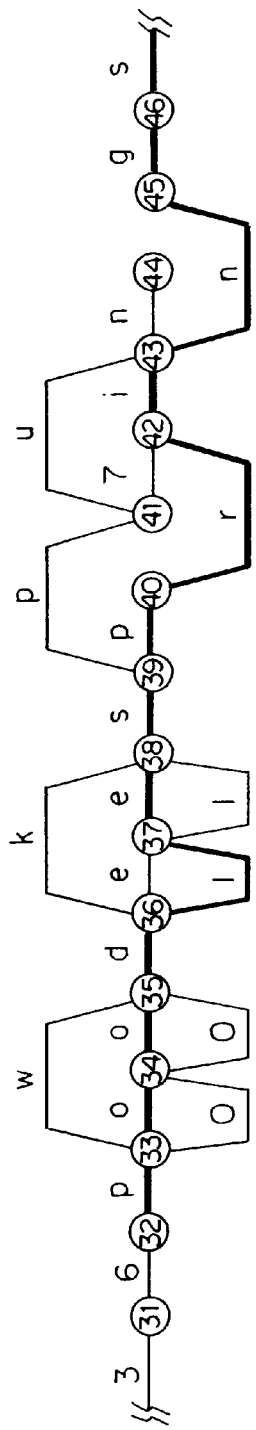
FIG. 7 illustrates an example of a classification result network.

As illustrated in FIG. 7, characters which have been identified by the character classification means 503 as being valid characters are connected to each other. Where several characters are identified as being valid, such characters are connected in the network as candidate characters. The resulting classification result network is output to the classification result path search means 504 which performs processings to determine a path in the classification result network in which key characters of a key character string are connected one to another. Thus, for example, if the key character string is "Poodle Springs", then the classification result path search means 504 compares each character of the classification result network to individual characters of the key character string. Characters in the classification result network that correspond to the characters of the key character string are connected to each other by a bold line which continues from the beginning of the network to its end. Thus, for example, the following key characters of the key character string are recognized: "P", "O", "O", "D", "L", "E", "S", "P", "R", "I", "N", "G" and "S". The classification result path search means 504 based on the classification result network and information of key character strings provided by the key character string dictionary 110 outputs an address character string. The address character string is provided to the address character string selection means 505 which selects and outputs information of the key character string position.

The character recognition processing performed as part of the processings of the character classification means 503 are similar to that disclosed in "Recognition Engineering" by Toriwaki, Television Society, page 52–53 and 179–181.

In FIG. 6, a node provided between each pair of portions of the character string indicates the boundary between the pair of portions of the character string. An identifying number is given to each of these nodes when the classification result network is produced as illustrated in FIG. 7. The classification result network as illustrated in FIG. 7 illustrates, for example, where several candidate characters have been recognized with respect to each portion of the character string arranged in the segmentation character string network illustrated in FIG. 6. For example, the characters "W", "O" and "O", and "O" and "O" were recognized as candidates corresponding to the portions of the character string set forth in the segmentation character string network as "O" and "O" in script. Information of the classification result network is stored in memory as a classification result table such as that illustrated in FIG. 8.

The classification result table as illustrated in FIG. 8 includes for each entry information of a starting point node (PND), end point node (NND), classification result character code (CD), certainty factor (CRD) and pointer to character information (PTN). Thus, when viewing the classification result network such as that illustrated in FIG. 8 a first entry thereof would, for example, include starting point node "31", end point node "32", classification result character code "6", certainty factor 0.6 and pointer which points to the portion of the character string corresponding to the character "6". The above described information with respect to the calculation of the certainty factor of the classification result table is disclosed, for example, in "Pattern Recognition", by Mori, Electronic Intelligence Communication Society. Therein the certainty factor is described as a measure of how accurate the recognition of the character has been performed.

The processings by the classification result path search means 504 using information of key character strings from the key character string dictionary 110 and the classification result network as illustrated in FIG. 7, are performed according to a width priority search alogrithm. The width priority search algorithm is disclosed, for example, in "Foundational Knowledge of Artificial Intelligence", by Tahara, Modern Science Company.

Figures 9A, 9B:
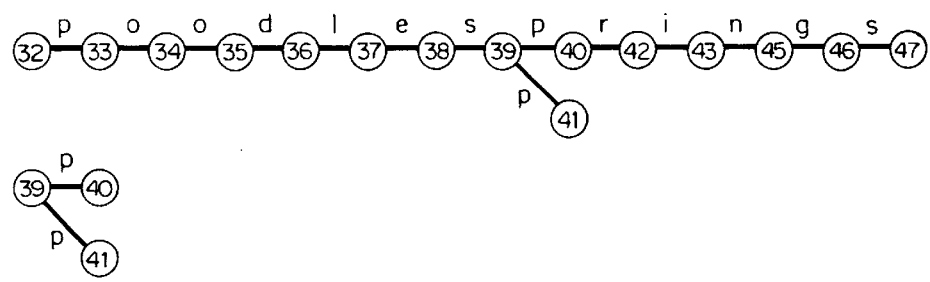
FIGS. 9A and B illustrate a search tree and a search tree table formed based on the search tree.

The processings performed by the classification result path search means 504 results in the production of search trees such as that illustrated in FIG. 9A. The nodes used in the search trees illustrated in FIG. 9A, each has the same identifier number as a corresponding node in the classification result network illustrated in FIG. 7. Further, the character codes between each of the nodes represent the character code recognized as corresponding to the portion of the character string. Since the classification result code that corresponds to the character "P" is detected in two places, accordingly two search trees are provided.

The classification result path search means 504 when searching for a key character string evaluates each character relative to the character string. For example, if "Poddle Springs" is considered a key character string, then the classification result path search means 504 proceeds through nodes "32", "33", "34", "35", "36", "37", "38", "39", "40", "42", "43", "45" and "46". The search did not proceed from, for example, "38", "39" and "41" since after the character "P" was recognized between nodes "38" and "40" the character codes between nodes "40" and "41" and nodes "41" and "42" do not correspond to any of the subsequent characters in the key character string. The character code "R" which exists between the nodes "40" and "42" does in fact match the character in the key character string which succeeds the character code "P" between the nodes "39" and "40". Once all of the character codes have been evaluated and all of the character codes of the character string match the key character string, then the character string is output as a key character string.

The search tree provided by the classification result path search means 504 is stored in storage as a search tree table such as that illustrated in FIG. 9B. Each entry of the Search Tree Table corresponds to a branch of the search tree. For each record, the Search Tree Table provides information of a pointer to a previous branch of the search tree (PRV), a search depth (DPT) indicating the level in the search tree the branch exists and a pointer to classification result data (PCLS). If a branch adjoins the route of a search tree such as, for example, nodes "32" and "33" or nodes "41" and "42" the value of PRV is made to be equal to null.

The processings performed by the classification result path search means 504 are illustrated in the flowchart of FIG. 10. It should be noted that each of the steps of the flowchart could, for example, correspond to one or more instructions of a computer program executable by the address reader 1205 so as to implement the classification result path search means 504. The computer program could, for example, be stored in the memory 1212 or the external memory 1206 of the mail sorting machine illustrated in FIG. 12. The computer program could also be provided to the mail sorting machine by a storage medium or by a network connected to the mail sorting machine. The storage medium could, for example, be a floppy disk, CD Rom, etc. Further, the computer program can be written in the "C" computer language and the data used by the computer program can be arranged to conform with the requirements of the "C" language.

The processings of the classification result path search means 504 as illustrated by the flowchart of FIG. 10 are as follows. A pointer (PC) to a particular branch of search tree branch data and another pointer (PW) to a location in the search tree branch data in which new branch data is to be written are set to the first entry of the search tree table as illustrated in FIG. 9B (step 1001). Thereafter, a first control loop process (step 1002) is performed with respect to all key character strings. By use of each key character string and information from the classification result table as illustrated in FIG. 8, a second control loop process (step 1003) is performed.

The second control loop process (step 1003) causes an indication to be output as to whether a classification result character code corresponds to a first character of a key character string. If the classification result character code is determined to correspond to a first character of a key character string then the branch that corresponds to the classification result character code is generated. Thus, the starting node of such a branch is set to be equivalent to the root of a search tree (steps 1003-A through 1003-E).

If the first pointer PC and second pointer PW are not equal to each other (step 1004) then the following processing is performed. If a search depth (DPT) has a smaller number of characters then the key character string and the branch of concern corresponds to the last character of a key character string, it is determined that a key character string has been detected. Thereafter, the character string that corresponds to a search route through the classification result network having characters corresponding to the characters included in the key character string is output as a character string including a key character string (steps 1004-A through 1004-D).

If the search depth (DPT) does not have a smaller number of characters then the key character string then a third control loop process (step 1005) relative to each entry of the classification result table is performed. In the third control loop process (step 1005), each of the entries of the classification result table is analyzed to determine whether a classification result character code thereof corresponds to a second character of a key character string and whether the branch of the classification result code adjoins the classification result network (steps 1005A through 1005-D). If the classification result character code does correspond to the second character of the key character string, then the branch of the search tree corresponding to the classification result character code is retrieved and the second pointer (PW) is increased (step 1005-E).

After repeating the above described processings set forth in second and third control loop processes (steps 1004 and 1005), if the first pointer PC and the second pointer PW becomes equal to each other indicating that there is no node in the middle of a search path, the third control loop process (step 1004) is ended and the first pointer PC is increased (step 1004-E).

When the classification result path search processing is performed by the classification result path search means 504 in some instances several candidates may be output. The address character string selection means 116 selects an optimum key character string from the information output by the classification result path search means 504. The optimum key character string is selected based upon information indicating the certainty with which a character has been recognized. This information is provided, for example, in the classification result table as certainty factor (CCR).

Further, with respect to the invention as illustrated in FIG. 1, a character string containing a key character string is detected by the character string detection means 107. The information output by the character string detection means 107 is used by the character string position test means 111 along with information of the candidate character direction from the direction constriction means 104 and information of the character string prohibition area 120 so as to output an approved test result. Particularly, the character string position test means 111 determines whether the detected character string fits within a character string prohibition area indicated by the character string prohibition area information 120. This testing makes use of information of the character direction of the character string.

The processings performed by the character string position test means 111 is to determine, for example, as illustrated in FIGS. 4D and 4F, whether the character string fits within the areas on which an address is prohibited and whether the character direction of the character strings is appropriate to the areas in which an address can be placed. As a result of such processings, the character string position test means 111 outputs an approved test result to the position relation analysis means 112.

If several address area candidates are output by the address area candidate test means 103 then an address area candidate most likely to contain a valid receiver address is selected by the position relation analysis means 112 based on position relation information 121. The position relation information 121 is, for example, unique to styles of addressing used in various countries. The position relation information 121 indicates, for example, appropriate positional relations between receiver and sender address areas on the surface of mail in, for example, the United States.

In addition to the various addressing styles illustrated in FIGS. 4A–8, other styles including receiver and sender addresses are illustrated in FIGS. 11A–E.

Figure 11A:
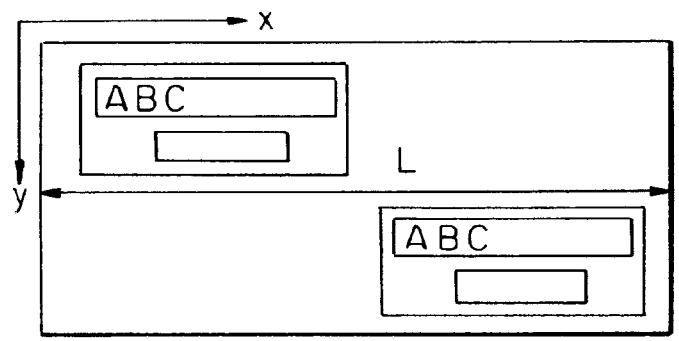
FIGS. 11A–E illustrate examples of using predetermined information in position relation analysis processing.

FIG. 11A illustrates a mail image which is rectangular in shape, wherein in the lateral direction two address area candidates were detected. The first address area candidate is in the upper left area and a second address area candidate is in the lower right area of the image of the surface of the mail. Typically, in such a configuration the address area candidate in the upper left area is a sender address and the address area candidate in the lower right area is a receiver address.

Figure 11B:
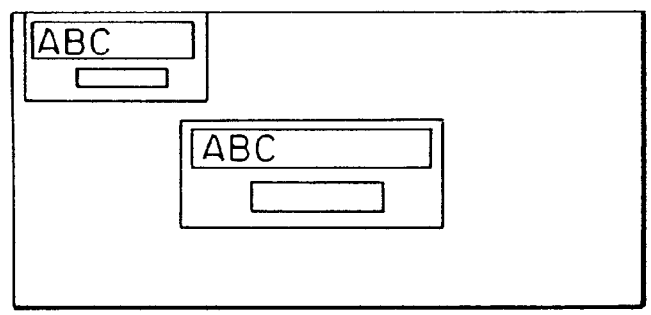

FIG. 11B illustrates a rectangular shaped image on the surface of mail, wherein a first address area candidate is detected in the extreme upper left area of the image and another address area candidate is detected in the center of the image. Typically, the address area candidate in the extreme upper left area of the image is a sender address and the address area candidate in the center of the image is a receiver address.

Figure 11C:
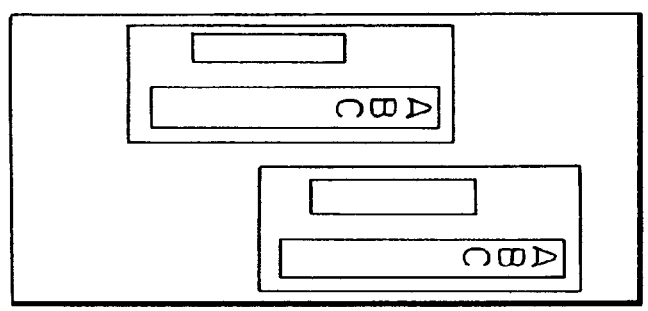

FIG. 11C illustrates a rectangular shaped image of the surface of mail, wherein the characters are positioned in a vertical direction one on top of the other. A first address area candidate is detected in an upper portion of the image and a second address area candidate is detected in a lower portion of the image. In such a configuration, the address area candidate in the upper area of the image is considered the sender address and the address area candidate in the lower area of the image is considered a receiver address.

Figure 11D:
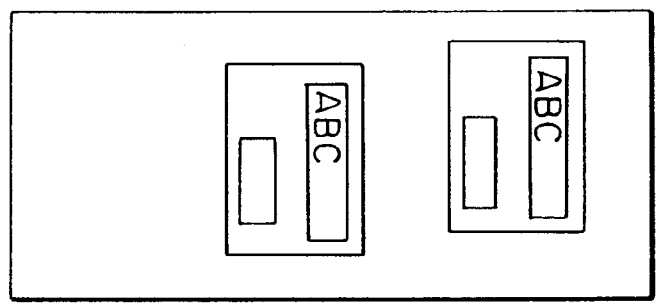

FIG. 11D illustrates an image of the surface of mail having a rectangular shape. A first address area is detected in an area closest to the short side of the rectangular shaped image, wherein the character string in the address area candidate is parallel to the short side of the image. A second address area is detected at the center of the image between the two short sides of the rectangular image. The character string in the second address area candidate is parallel to the short sides of the rectangular image. In such a configuration, the first address area candidate is considered the sender address and the second address area is considered the receiver address.

Figure 11E:
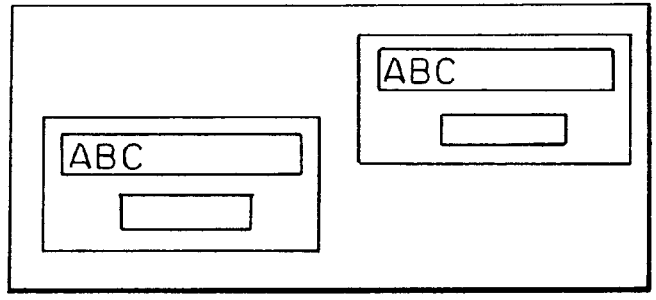

FIG. 11E illustrates an image of the surface of mail having a configuration which is not typical of mail in the United States. Particularly, a first address area candidate is detected as being in an upper right area of the rectangular image and a second address area candidate is detected as being in the lower left area of the image. If such a configuration is detected it becomes difficult to determine which of the address area candidates contain the sender address and the receiver address.

In FIG. 11A when an image of mail is oblong, a character string line is described horizontally, and a character string of the receiver address is in the lower area.

The conditions for selection are as follows:

(X1, Y1) is the coordinates of the center of gravity of address area candidate 1; (X2, Y2) is the coordinates of the center of gravity of address area candidate 2; and L is the length of a longer side of mail image;

If $x1<x2$, $y1<y2$ and $|x2-L/2|>L5$, then address area candidate 1 is selected.

In FIG. 11B when the image of mail is oblong, a character is described horizontally, and a character string of a receiver address is in the lower area and or the following conditions:

If $x1<x2$, $y1<y2$ and $|x2-L/2|<L/5$, then address area candidate 2 is selected.

In FIG. 11C when the image of mail is oblong, a character string is parallel to the long sides of the image, and a character string of a receiver address is in the lower area under the following conditions:

If $y1>y2$, then address area candidate 1 is selected.

In FIG. 11D when the image of mail is oblong, a character string is parallel to the short sides of the image, and a character string of a receiver address is in the center area under the following conditions:

If $x1>x2$, then address area candidate 1 is selected.

In FIG. 11E when the predetermined condition of either position relation is not satisfied, a judgement of the proper address area candidate cannot be made. Then the address position relation analysis means 112 outputs information that such judgement cannot be made.

If, for example, a specific key character string such as "to" is detected, the address area candidate with such specific key character string is selected as a receiver address without regard to the position of the address area candidate.

The key character string "to" typically indicates that the address that follows is the receiver address.

When a single address area candidate is selected based on the processing performed by the position relation analysis means 112 based on position relation information 121, the single address area candidate is output to the sender information reference means 113 for processing. The sender information reference means 113 analyzes the character string contained in the address area candidate by use of the sender information 114 to determine whether the address area candidate contains information such as the sender address. If the sender address is contained in the character string of the address area candidate, then the address area candidate is indicated as not being a valid receiver address. As described above, the sender information 114 could include, for example, information of the region or neighborhood in which the sender is located or information of the location of the mail sorting machine. Such information contained in the character string of the address area candidate would, for example, indicate that the address area candidate is the sender address rather than the receiver address.

If a plurality of address area candidates are selected, then the sender information reference means 113 analyzes each of the address area candidates using the above described processing performed when a single address area candidate is selected. It is assumed that the address area candidate which does not contain sender information is an address area candidate containing the receiver address. If it is determined that none of the address area candidates contain a receiver address then the address area candidate selection means 116 provides an indication that no address area candidate on the surface of the mail having a receiver address has been found. Such an indication allows for other types of processings to be performed by the mail sorting machine.

The above features of the present invention described with respect to FIGS. 1, 2, 5 and 10 are embodied in the mail sorting machine illustrated in FIG. 12. As described above, the mail sorting machine includes a scanner 1201, delay line 202, sorter 1203, address reader 1205 and external memory 1206. A basic operation of the mail sorting machine is as follows.

Mail to be sorted is scanned by the scanner 1201 and an image of a surface of the mail is provided to the address reader 1205. The mail is moved by a conveyor belt, or the like, to a delay line 1202 for holding the mail while the address reader 1205 performs processing so as to recognize the receiver address on the surface of the mail. Once the receiver address has been recognized, the mail is again moved by conveyor belt, or the like, to a sorter 1203 which sorts the mail in response to the recognized receiver address output from the address reader 1205. The address reader 1205 performs processing based on information and computer programs provided by the memory 1212 included within the address reader 1205 and information and computer programs provided by the external memory 1206 connected to the address reader 1205.

The address reader 1205 includes a pre-processing module 1204 which pre-processes the image of the surface of the mail from the scanner 1201 and provides pre-processed image information to the input/output interface 1207. The input/output interface 1207 inputs pre-processed image information onto the bus line 1210 and outputs, for example, control signals to the pre-processing module 1204 and the scanner 1201 that have been provided on the bus line 1210.

A processor 1211 is provided in the address reader 1205 for inputting the image information from the input/output interface 1207 and executing, for example, computer programs 1212-A contained in the memory 1212 and/or computer programs 1206-A contained in the external memory 1206. Executing such computer programs cause the processor 1211 to perform the previously described processings illustrated, for example, in the data flow charts and the flowcharts of FIGS. 1, 2, 5 and 10. Further, the processor 1211 based on execution of such computer programs makes use of various information contained in various memory address areas in the memory 1212 and files in the external memory 1206.

The various memory address areas of the memory 1212 could, for example, include reference character dictionary 1212-B, address prohibition area information 1212-C, character string prohibition area dictionary 1212-D, key character string dictionary 1212-E, position relation information 1212-F, sender information 1212-G, character string image information 1212-H, address area candidate 1212-I, segmentation character string network 1212-J, classification result network 1212-K and search tree 1212-L. The files in the external memory 1206 could, for example, include reference character dictionary file 1206-B, address prohibition area file 1206-C, character string prohibition area dictionary 1206-D, key character string dictionary file 1206-E, position relation file 1206-F, and sender information 1206-G.

Once the processor 1211 performs the processings illustrated in FIGS. 1, 2, 5 and 10, information concerning a recognized receiver address is output from the processor 1211 onto the bus line 1210. Information of the recognized receiver address is then output from the bus line 1210 through the input/output interface 1208 to the address recognition module 1213. The address recognition module 1213 receives such information and provides processing relative to the recognized receiver address so as to appropriately control the sorter 1203. The sorter 1203 sorts the mail relative to the recognized receiver address. Information from the sorter 1203 can also be input to the bus line 1210 via the address recognition module 1213 and input/output interface 1208. Such information is then provided on the bus line 1210 and used by the processor 1211 to perform various processings including providing control signals to the address recognition module 1213 and the sorter 1203.

While the present invention has been described in detail and pictorially in the accompanying drawings, it is not limited to such details since many changes and modification recognizable to these of ordinary skill in the art having the benefit of this invention may be made to the invention without departing from the spirit and scope of the invention, and all such modifications as would be obvious to one skilled in the art and/or which become possible as technology develops, are intended to be included within the scope of the following claims.

We claim:

1. An address reader method of recognizing a receiver address on a surface of mail, said address reader method comprising:

inputting an image of the surface of mail;

segmenting said image into at least one character string candidate;

extracting at least one address area candidate based on said at least one character string candidate;

selecting one of said at least one address area candidate as a receiver address area of the mail by analyzing each of said at least one address area candidate based on predetermined position information indicating a usual position of a receiver address area, character direction information indicating a character direction of a character string appropriate for said predetermined position information, and key character string information indicating a character string most likely to exist in a receiver address; and recognizing characters in character strings of the selected address area candidate as a receiver address, wherein said selecting comprises:

testing each address area candidate to determine whether said address area candidate is an address area candidate most likely to contain a receiver address, wherein said testing comprises:

making an assumption that character strings contained in said address area candidate are in a particular character direction and analyzing said character strings based on the assumption, wherein said making an assumption comprises:

detecting characters of a character string based on reference character information, and wherein said making an assumption comprises:

testing, based on character string prohibition area information, whether characters of the character string detected by said detecting are placed in an area on the surface of the mail in which a receiver address is prohibited.

2. An address reader apparatus, for recognizing a receiver address on a surface of mail, said address reader apparatus comprising:

an image input apparatus which inputs an image of the surface of mail;

an address processing apparatus which segments said image into at least one character string candidate, extracts at least one address area candidate based on said at least one character string candidate, and selects one of said at least one address area candidate as a receiver address area of the mail by analyzing each of said at least one address area candidate based on predetermined position information indicating a usual position of a receiver address area, character direction information indicating a character direction of a character string appropriate for said predetermined position information, and key character string information indicating a character string most likely to exist in a receiver address; and an address recognition module which recognizes characters in character strings of the selected address area candidate as a receiver address, wherein said address processing apparatus tests each address area candidate to determine whether said address area candidate is an address area candidate most likely to contain a receiver address, wherein said address processing apparatus when performing said testing makes an assumption that character strings contained in said address area candidate are in a particular character direction and analyzing said character strings based on the assumption, wherein said address processing apparatus when performing said making an assumption detects characters of a character string based on reference character information, and wherein said address processing apparatus when performing said making an assumption tests, based on character string prohibition area information, whether characters of the character string detected by said detecting are placed in an area on the surface of the mail in which a receiver address is prohibited.

3. A mail sorting machine for sorting mail, comprising:

a scanner which scans a surface of the mail and outputs an image of the surface of the mail based on the scan;

an address reader apparatus for recognizing a receiver address on a surface of mail, said address reader apparatus comprises:

an image input apparatus which inputs said image of the surface of the mail from said scanner, an address processing apparatus which segments said image into at least one character string candidate, extracts at least one address area candidate based on said at least one character string candidate, and selects one of said at least one address area candidate as a receiver address area of the mail by analyzing each of said at least one address area candidate based on predetermined position information indicating a usual position of a receiver address area, character direction information indicating a character direction of a character string appropriate for said predetermined position information, and key character string information indicating a character string most likely to exist in a receiver address, and an address recognition module which recognizes characters in character strings of the selected address area candidate as a receiver address; and a sorter which sorts the mail based on the receiver address recognized by said address recognition module, wherein said address processing apparatus tests each address area candidate to determine whether said address area candidate is an address area candidate most likely to contain a receiver address, wherein said address processing apparatus when performing said testing makes an assumption that character strings contained in said address area candidate are in a particular character direction and analyzing said character strings based on the assumption, wherein said address processing apparatus when performing said making an assumption detects characters of a character string based on reference character information, and wherein said address processing apparatus when performing said making an assumption tests, based on character string prohibition area information, whether characters of the character string detected by said detecting are placed in an area on the surface of the mail in which a receiver address is prohibited.

* * * * *